US011422303B2

(12) United States Patent
Levy et al.

(10) Patent No.: US 11,422,303 B2
(45) Date of Patent: Aug. 23, 2022

(54) WAVEGUIDE WITH ATTENUATOR

(71) Applicant: GLOBALFOUNDRIES U.S. Inc., Santa Clara, CA (US)

(72) Inventors: Mark D. Levy, Williston, VT (US); Siva P. Adusumilli, South Burlington, VT (US); Yusheng Bian, Ballston Lake, NY (US)

(73) Assignee: GLOBALFOUNDRIES U.S. INC., Malta, NY (US)

( * ) Notice: Subject to any disclaimer, the term of this patent is extended or adjusted under 35 U.S.C. 154(b) by 0 days.

(21) Appl. No.: 17/108,732

(22) Filed: Dec. 1, 2020

(65) Prior Publication Data

US 2022/0171123 A1 Jun. 2, 2022

(51) Int. Cl.
*G02B 6/12* (2006.01)
*G02B 6/122* (2006.01)
*G02B 6/13* (2006.01)
*G02B 6/24* (2006.01)

(52) U.S. Cl.
CPC ............. *G02B 6/122* (2013.01); *G02B 6/13* (2013.01); *G02B 6/243* (2013.01); *G02B 2006/12061* (2013.01); *G02B 2006/12126* (2013.01)

(58) Field of Classification Search
None
See application file for complete search history.

(56) References Cited

U.S. PATENT DOCUMENTS

| 4,799,031 A | 1/1989 | Lang et al. |
| 7,002,429 B2 | 2/2006 | Asao et al. |
| 9,059,252 B1 | 6/2015 | Liu et al. |
| 10,393,960 B1 | 8/2019 | Shank et al. |
| 10,446,643 B2 | 10/2019 | Stamper et al. |
| 2015/0340273 A1* | 11/2015 | Jaffe .................... G02B 6/1347 257/506 |

* cited by examiner

*Primary Examiner* — Michael Stahl
(74) *Attorney, Agent, or Firm* — Francois Pagette; Andrew M. Calderon; Roberts Calderon Safran & Cole, P.C.

(57) ABSTRACT

The present disclosure relates to semiconductor structures and, more particularly, to a waveguide structure with attenuator and methods of manufacture. The structure includes: a waveguide structure including semiconductor material; an attenuator underneath the waveguide structure; an airgap structure vertically aligned with and underneath the waveguide structure and the attenuator; and shallow trench isolation structures on sides of the waveguide structure and merging with the airgap structure.

18 Claims, 5 Drawing Sheets

WAVEGUIDE WITH ATTENUATOR

FIELD OF THE INVENTION

The present disclosure relates to semiconductor structures and, more particularly, to a waveguide structure with attenuator and methods of manufacture.

BACKGROUND

Semiconductor optical waveguide structures (e.g., photonic components) are an important component of integrated optoelectronic systems. For example, a semiconductor optical waveguide structure is capable of guiding optical waves (e.g., light) with minimal loss of energy by restricting expansion of the light into the surrounding substrate. The optical waveguide structure can be used in many different applications including, e.g., semiconductor lasers, optical filters, switches, modulators, isolators, and photodetectors. The use of semiconductor material also enables monolithic integration into optoelectronic devices using known fabrication techniques.

Open or unconnected ports or other termination points of the photonics device can result in leakage or backscatter of the optical signal back into the chip. This can also cause crosstalk with other photonic devices, as well as overall interference of the optical signal. To prevent such issues from occurring, an absorber is coupled to the open or unconnected ports or other termination points of the photonics device. Ge is a commonly utilized absorber material in the fabrication of photonic devices, which is easily integrated into the fabrication processes of the photonics devices.

SUMMARY

In an aspect of the disclosure, a structure comprises: a waveguide structure comprising semiconductor material; an attenuator underneath the waveguide structure; an airgap structure vertically aligned with and underneath the waveguide structure and the attenuator; and shallow trench isolation structures on sides of the waveguide structure and merging with the airgap structure.

In an aspect of the disclosure, a structure comprising: a waveguide structure on bulk substrate and comprising a first semiconductor material; an attenuator vertically aligned with and underneath the waveguide structure, the attenuator comprising a second semiconductor material different than the first semiconductor material; an airgap vertically aligned with the waveguide structure and the attenuator, the airgap being sealed with the second semiconductor material and lined with dielectric material underneath the waveguide structure; and shallow trench isolation structures comprising dielectric material on sides of the waveguide structure.

In an aspect of the disclosure, a method comprises: forming a waveguide structure comprising semiconductor material; forming an attenuator underneath the waveguide structure; forming an airgap structure vertically aligned with and underneath the waveguide structure and the attenuator; and forming shallow trench isolation structures on sides of the waveguide structure and merging with the airgap structure.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to a waveguide structure with attenuator and methods of manufacture. More specifically, the present disclosure relates to a waveguide structure with self-aligned attenuator on a bulk wafer. Advantageously, the waveguide structure with self-aligned attenuator can be formed on a bulk wafer which allows for easy integration with other devices, e.g., CMOS, bipolar junction transistors (BJT), etc. The waveguide structure with self-aligned attenuator also provides a compact footprint.

In embodiments, the structures described herein include an attenuator co-formed with and self-aligned to a waveguide structure (e.g., photodetector). The attenuator and waveguide structure are formed on bulk substrate. The waveguide structure can be Si material and the attenuator can be Ge or SiGe, as examples, formed over a sealed airgap structure. The airgap structure can be sealed with Si, SiGe or Ge, and bounded with dielectric material from shallow trench isolation structures. In embodiments, the shallow trench isolation structures can define the dimensions of the waveguide structure which also clad the waveguide structure with oxide or other dielectric material on all sides. The oxide or other dielectric material of the shallow trench isolation structures can also line the airgap structure such that the waveguide structure is clad on the bottom with the oxide or other dielectric material. Also, the attenuator can be bar shape with an aspect ratio of greater than 1:1.

The waveguide structure with attenuator of the present disclosure can be manufactured in a number of ways using a number of different tools. In general, though, the methodologies and tools are used to form structures with dimensions in the micrometer and nanometer scale. The methodologies, i.e., technologies, employed to manufacture the waveguide structure with attenuator of the present disclosure have been adopted from integrated circuit (IC) technology. For example, the structures are built on wafers and are realized in films of material patterned by photolithographic processes on the top of a wafer. In particular, the fabrication of the waveguide structure with attenuator uses three basic building blocks: (i) deposition of thin films of material on a substrate, (ii) applying a patterned mask on top of the films by photolithographic imaging, and (iii) etching the films selectively to the mask.

Figure 1:
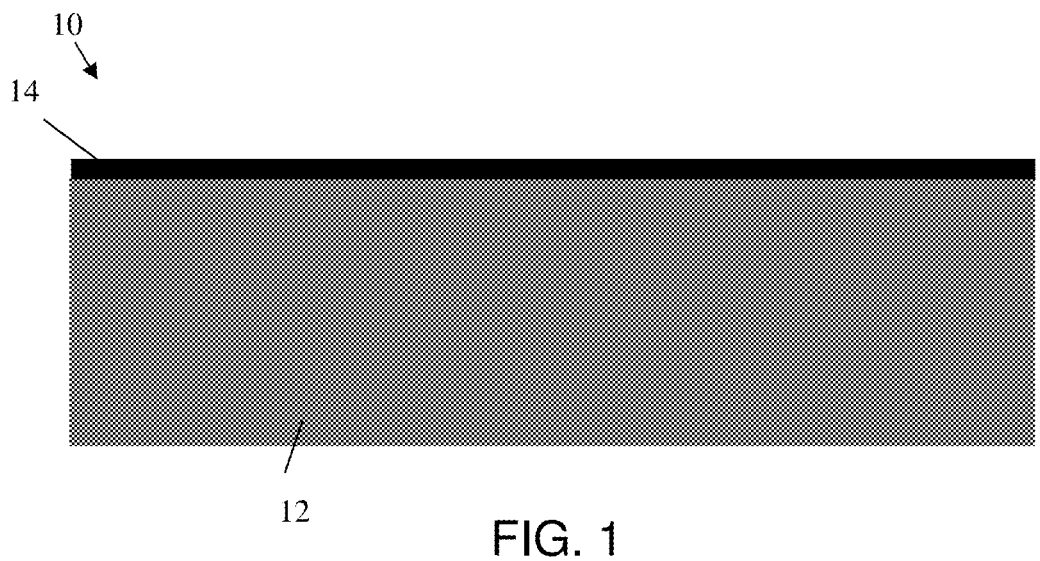
FIG. 1 shows an incoming structure in accordance with aspects of the present disclosure.

FIG. 1 shows an incoming structure in accordance with aspects of the present disclosure. In particular, the structure 10 includes a substrate 12 comprising any bulk semiconductor material. For example, the substrate 12 can be composed of any suitable bulk semiconductor materials such as, e.g., Si, SiGe, SiGeC, SiC, GaAs, InAs, InP, and other III/V or II/VI compound semiconductors.

Still referring to FIG. 1, one or more pad films 14 can be formed, e.g., deposited, on the substrate 12. The pad films 14 can be oxide or nitride, as examples. By way of illustrative, non-limiting examples, the nitride can be deposited by a conventional deposition process, e.g., chemical vapor deposition (CVD), to a thickness of about 100 nm to 200 nm; whereas, the oxide can be deposited to a thickness of about to 10 nm. In embodiments, the oxide can be formed in furnace oxidizations of the Si when the substrate 12 comprises Si material.

Figure 2:
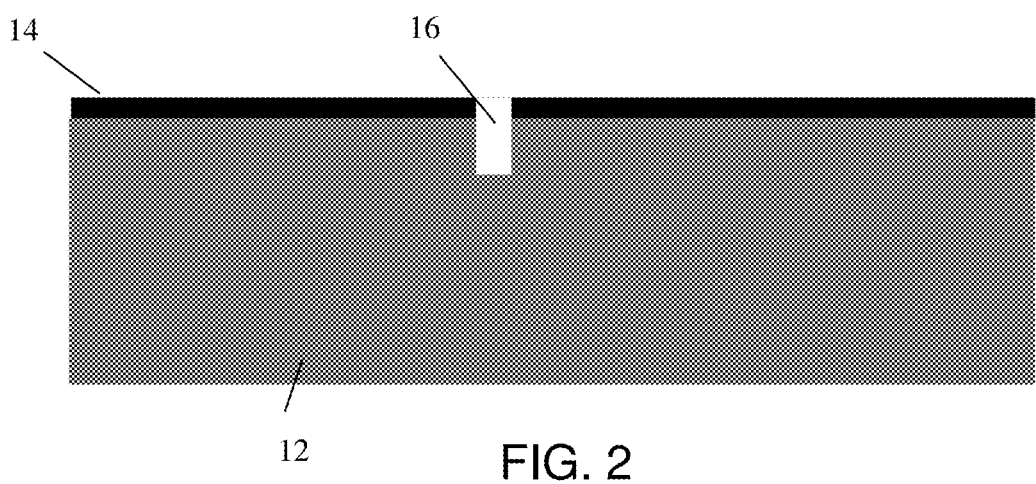
FIG. 2 shows a plurality of trenches patterned in pad dielectric films and substrate, and respective fabrication processes in accordance with aspects of the present disclosure.

In FIG. 2, a plurality of trenches 16 can be patterned in the pad dielectric films 14 and the substrate 12 using conventional lithography and etching processes. For example, a resist formed over the pad dielectric films 14 is exposed to energy (light) to form a pattern (opening). An etching process with a selective chemistry, e.g., reactive ion etching (RIE), will be used to form one or more trenches 16 through the openings of the resist, through the pad film(s) 14 and into the substrate 12. The resist can then be removed by a conventional oxygen ashing process or other known stripants. A single trench 16 is shown for illustrative purposes, although several trenches are contemplated herein to form multiple attenuators as shown, for example, in FIG. 9A.

The trenches 16 can be shaped as "bars" with an aspect ratio of greater than 1:1 as seen from above. For example, the aspect ratio of the trenches 16 can be about 10:1. In one illustrative example, the width of the trenches 16 can be approximately 0.1 μm to 0.25 μm and the length of the trenches 16 can be about 5.0 μm; although other dimensions are contemplated herein. As described herein, the trenches 16 will be used to form oblong or bar shaped attenuators.

Figure 3:
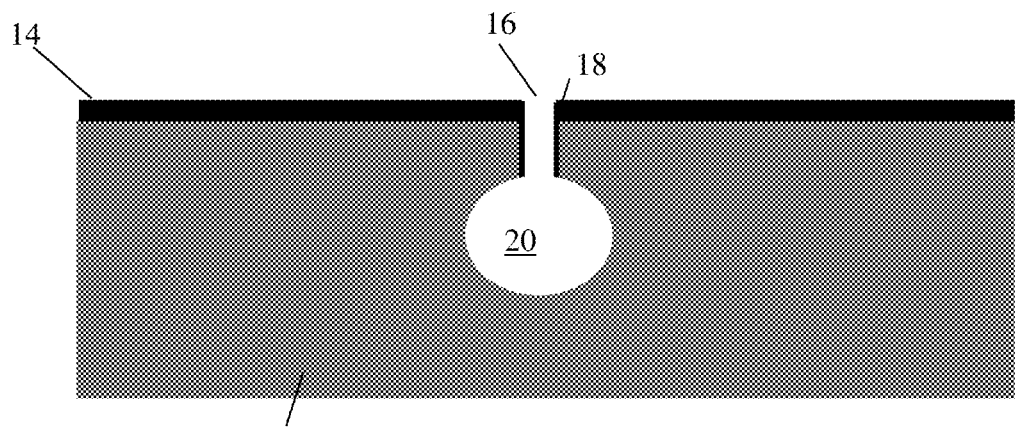
FIG. 3 shows a sidewall liner on the sidewalls of the trenches and a cavity structure, amongst other features, and respective fabrication processes in accordance with aspects of the present disclosure.

Referring to FIG. 3, a sidewall liner 18 can be formed on the sidewalls of the trenches 16 by depositing a dielectric material followed by anisotropic etching process of the dielectric material from the bottom of the trenches 16 and top planar features of the structure. In embodiments, the sidewall liner 18 can be any suitable dielectric material(s) such oxide or nitride or a combination of dielectric layers deposited using any known deposition method, e.g., CVD, thermal oxidization of the silicon substrate, atomic layer deposition (ALD) or any combinations thereof. The anisotropic etch could comprise a RIE using a perfluorocarbon-based chemistry, as is known in the art, which etches material from planar surfaces but leaves the dielectric material (e.g., sidewall liner 18) on the sidewall of the trenches 16.

In embodiments, the sidewall liner 18 should robustly coat the sidewalls of the trenches 16 in order to protect the underlying substrate 12 from subsequent etching processes (for cavity formation). To achieve this robust sidewall coverage, the dielectric material or materials should be thick enough to leave a film on the sidewalls of the trenches 16 but not too thick that it pinches off the top opening of the trenches 16, which would prevent cavity formation during the successive cavity etch process.

As further shown in FIG. 3, a cavity structure 20 can be formed in the substrate 12 by a substrate etching process through the bottom of the trenches 16. The pad films 14 on the substrate surface and the sidewall liner 18 of the trenches 16 protect the substrate 12 from being unintentionally etched during formation of the cavity structure 20. In embodiments, prior to the cavity formation, an optional vapor or liquid HF treatment, hydrogen plasma, anneal, basic or acidic chemical clean, or any process known to remove thin or native dielectrics or residual spacer etch polymer from the substrate 12 (e.g., silicon) can be used to remove any excessive dielectric material at a bottom of the trenches 16. The post sidewall liner etch cleans (e.g., anisotropic etch) should leave a robust dielectric liner, e.g., sidewall liner 18, on the top corner and sidewalls of the trenches 16 to prevent etching of the substrate 12 through the sidewall of the trenches 16 during the cavity formation.

In embodiments, the cavity structure 20 can be an oblong structure formed by removing the substrate material 12 under each trench 16. In embodiments, the cavity structure 20 can have a length of about 5 μm or longer with a width of about 2 μm, although other dimensions are also contemplated herein. The removal of the material of the substrate 12 can be by a wet etching process or dry etching process. For example, dry etchants can include plasma-based $CF_4$, plasma-based $SF_6$, or gas $XeF_4$ silicon etch, etc., and wet etching processes can include KOH and $NH_4OH$.

Figure 4:
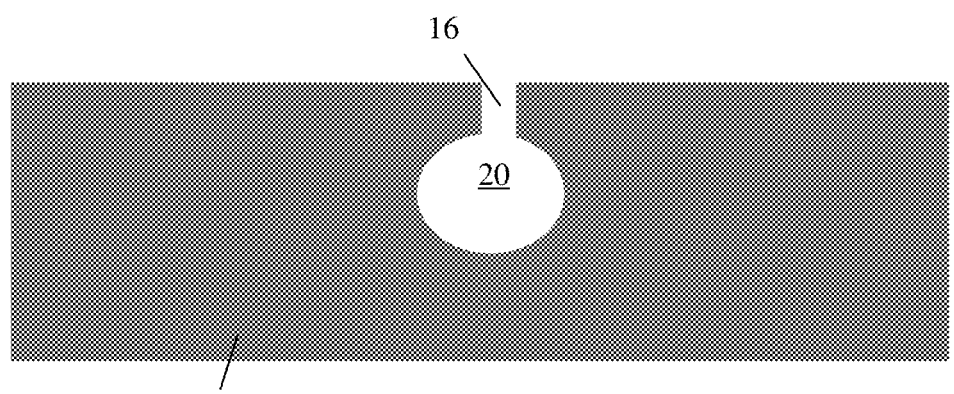
FIG. 4 shows the trenches without any sidewall liner material, amongst other features, and respective fabrication processes in accordance with aspects of the present disclosure.

In FIG. 4, the sidewall liner 18 and pad film(s) 14 can be removed from the structure, exposing the upper surface of the substrate 12 and the sidewalls of the trenches 16. In embodiments, the sidewall liner 18 and pad film(s) 14 can be removed by a conventional etching process selective to such materials. For example, the sidewall liner 18 and pad dielectric film(s) 14 can be removed by, for example, hot phosphoric acid followed by an HF chemistry or vice-versa depending on the single dielectric layer or stack of different dielectric layers used for sidewall liner 18.

Following the removal of the sidewall liner 18 and pad film(s) 14, the trenches 16 can be subjected to an optional annealing process to soften or round (curve) the edges of the trenches 16. In embodiments, the annealing in a $H_2$ or other hydrogen atmosphere may remove any native or other oxide from the silicon substrate surface. The annealing can also be provided in other atmospheres, e.g., $NH_3$, $B_2H_6$, $Ph_3$, $AsH_2$ or other gases bonded to hydrogen. By way of one example, following an HF preclean process, the structure can undergo an annealing process at a temperature range of about 800° C. to about 1100° C., for up to about 60 seconds. If little or no curvature is required, then the annealing temperature, time, or hydrogen-based gas flow is reduced to eliminate or minimize the silicon substrate reflow.

Figure 5:
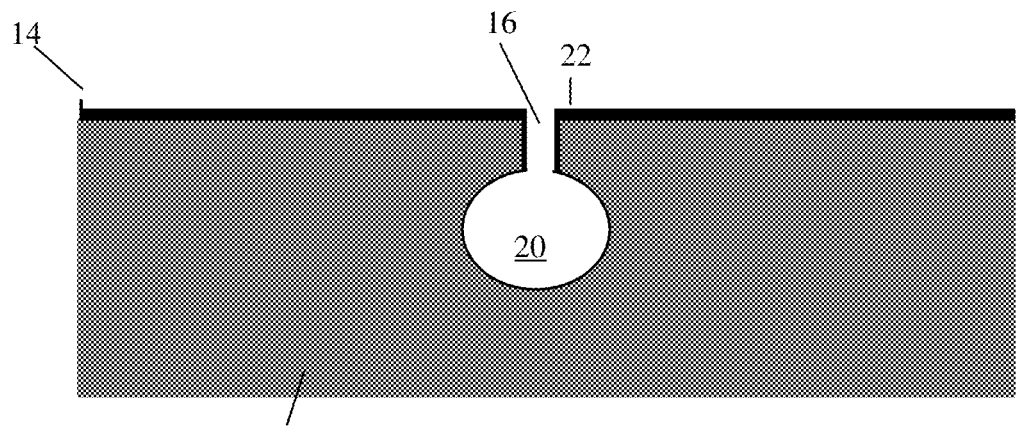
FIG. 5 shows epitaxial material lining the trenches and cavity structure, amongst other features, and respective fabrication processes in accordance with aspects of the present disclosure.

In FIG. 5, a material 22 can be formed on the surface of the substrate 12 including sidewalls of the trenches 16 and sidewalls of the cavity structure 20. In embodiments, the material 22 can be epitaxial Ge material deposited using ultra high vacuum CVD (UHVCVD); although other semiconductor materials which can be used as an attenuator are also contemplated herein. For example, the present disclosure contemplates the use of semiconductor material that has a bandgap similar to the substrate 12 and which is capable of a reflow process as described herein, e.g., SiGe. In embodiments, Ge material can be deposited at a temperature of about 600° C. to 750° C., resulting in a thickness of about 5 nm to about 50 nm. It should be understood that the thicknesses of the material 22 can depend on the critical dimension of the trenches 16.

Figure 6:
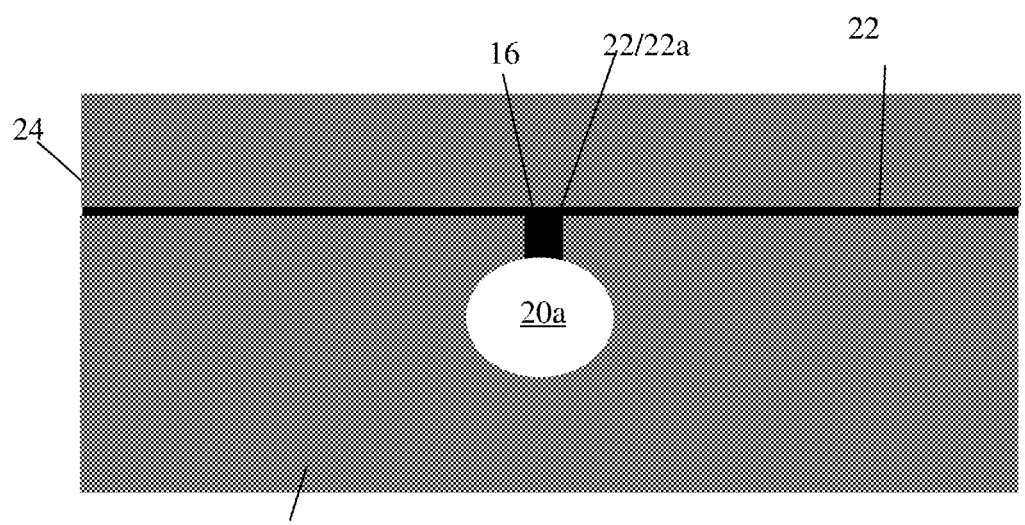
FIG. 6 shows the epitaxial material sealing the cavity structure, amongst other features, and respective fabrication processes in accordance with aspects of the present disclosure.

As shown in FIG. 6, the wafer is heated to equal to or greater than the reflow temperature of material 22 so that the material 22 fills in the top of trenches 16. More specifically, the material 22 has a reflow temperature lower than the substrate 12 so that the material 22 can reflow and seal the trenches 16 thereby forming sealed airgap structures 20a and an attenuator 22a. For example, Ge has a lower reflow temperature than Si such that the Ge can be reflowed into the opening of the trenches 16 to seal the top of the trenches 16 without filling in the cavity structure 20. In embodiments, the reflow temperature is 800-1050° C. and the reflow time is anywhere up to about 600 seconds.

The thickness and other dimensions of the reflowed material 22 within the trenches 16 can vary depending on the depth and other dimensions of the trenches 16. Illustratively, the reflowed material 22 can be thicker with a deeper trench 16, wider with a wider trench 16 and longer with a longer trench 16. In one example, the thickness of the material 22 can be 0.2 µm to 0.5 µm, with a width of about 0.10 µm to 0.25 µm and a length of upwards or greater than 5.0 µm. In this way, the reflowed material 22 can be used as the attenuator 22a with an aspect ratio of greater than 1:1, and preferably about 1:10.

Also, as the trenches 16 are aligned with the airgap structure 20a, the reflowed material 22, e.g., attenuator 22a, will be axially aligned (e.g., vertically aligned) with the airgap structure 20a along its longitudinal axis. In this way, the attenuator can be self-aligned with the airgap structure 20a. Any remaining material 22 on the surface of the substrate 12 can be used as an etch stop or marker layer as it has a selectivity to the underlying substrate 12.

After the material 22 is reflowed to form the attenuator 22a, a semiconductor material 24 can be deposited over the trenches 16 and material 22. In embodiments, the semiconductor material 24 can be Si material or other semiconductor material used as a waveguide structure. As the semiconductor material 24 is positioned directly over and in contact with the reflowed material 22, i.e., attenuator 22a, it will also be aligned and parallel with the airgap structure 20a. The semiconductor material 24 can be epitaxially grown over the material 22 to a thickness of 0.3 µm or greater in a deposition chamber having a temperature of about 850° C. to about 1050° C. for about 60 seconds. At this temperature the material 22 can continue to reflow, continuing to gravitate or migrate into the upper portion of the trenches 16 (e.g., typically at the smallest critical dimension). In embodiments, the surface of the semiconductor material 24 can grow in a self-planarized fashion, e.g., have a flat surface. Also, the semiconductor material 24 can be used to further seal the cavity structure, e.g., airgap structure 20a.

Figure 7:
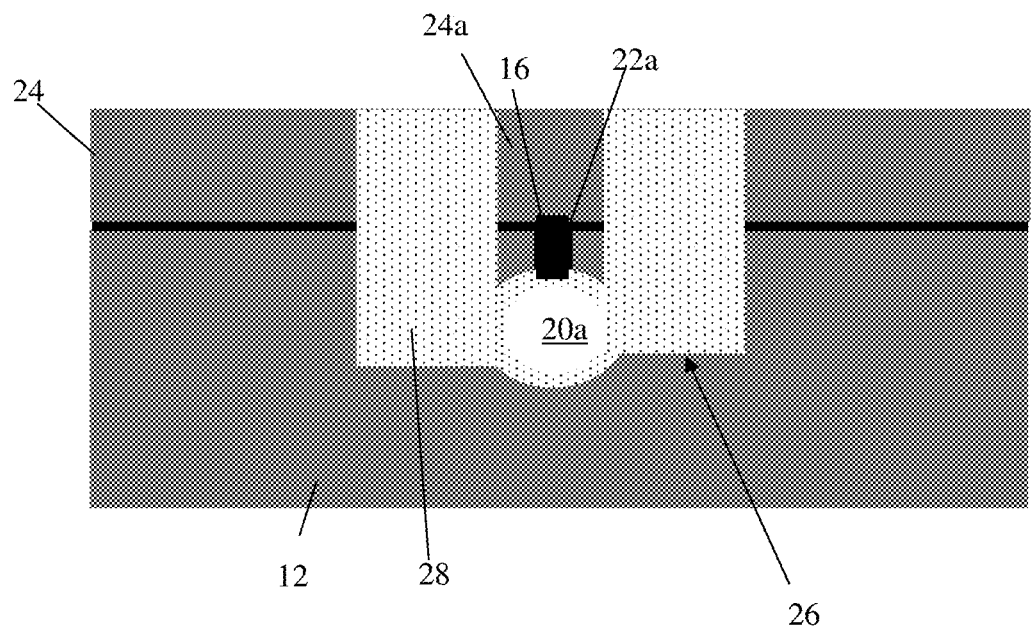
FIG. 7 shows shallow trench isolation structures on sides of a waveguide structure and attenuator, amongst other features, and respective fabrication processes in accordance with aspects of the present disclosure.

FIG. 7 shows shallow trench isolation structures 26 merging with sides of the airgap structure 20a. In embodiments, the shallow trench isolation structures 26 define the attenuator 22a composed of the reflowed material 22. In this implementation, the waveguide structure 24a can have a width of about 0.2 µm; although other dimensions are contemplated herein, e.g., 0.3 µm or greater.

As shown in FIG. 7, both the attenuator 22a, e.g., Ge material, and the waveguide structure 24a are vertically aligned with and over the airgap structure 20a, with the waveguide structure 24a over the attenuator 22a. Accordingly, the attenuator 22a and the waveguide structure 24a are both axially aligned with and over the airgap structure 20a, e.g., self-aligned to each other and to the airgap structure 20a.

In embodiments, the shallow trench isolation structures 26 are formed by conventional lithography, etching and deposition processes known to those of skill in the art such that no further explanation is required for a complete understanding of the present disclosure. In embodiments, the etching process to form shallow trenches may also be used to remove any residual material 22 in the airgap structure 20a. The shallow trenches also intersect or merge with the airgap structure 20a. In this way, a dielectric material 28, e.g., SiO$_2$, formed within shallow trenches can also be formed on sidewalls of the airgap structure 20a. The dielectric material 28 can be deposited by a conventional CVD process or can be a flowable oxide, e.g., Tetraethyl orthosilicate (TEOS) deposited by low pressure CVD (LPCVD) or a high aspect ratio process (HARP). In this way, the combination of the waveguide structure 24a and the attenuator 22a are bounded or clad on sides and bottom by the dielectric material 28. In embodiments, a lateral thickness of the shallow trench isolation structures 26 can be anything from approximately 0.2 µm, upwards.

In embodiments, the dielectric material 28, e.g., oxide, can have a thickness of about 100 Å or greater on sidewalls of the airgap structure 20a (not intersecting with the shallow trench isolation structures 26), depending on the deposition process used to deposit material in the shallow trench isolation structures 26. For example, a liner thickness of about 100 Å can be achieved using a thermal oxide process followed by a non-conformal high density plasma oxide deposition. On the other hand, in embodiments, the dielectric material 28 can completely fill or almost completely fill the airgap structure 20a by using, e.g., HARP. In this way, both the attenuator 22a and the waveguide structure 24a are clad (e.g., covered by) in dielectric material, e.g., oxide.

Figure 8:
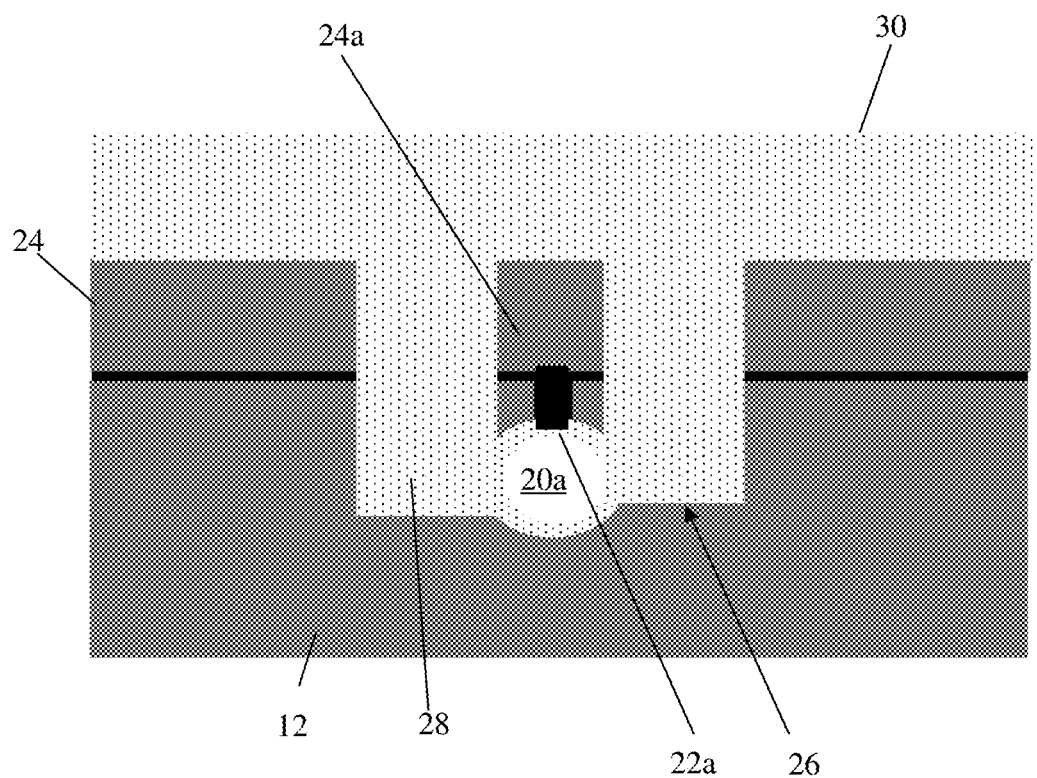
FIG. 8 shows an interlevel dielectric material over the waveguide structure and respective fabrication processes in accordance with aspects of the present disclosure.

FIG. 8 shows an interlevel dielectric material 30 formed over the waveguide structure 24a. As such, the waveguide structure 24a is now clad by dielectric material on an upper surface and on side surfaces by the shallow trench isolation structures 28. In embodiments, the interlevel dielectric material 30 can be an oxide material, e.g., SiO$_2$, deposited by a conventional deposition method. For example, the interlevel dielectric material 30 can be formed by a CVD process.

Figure 9A:
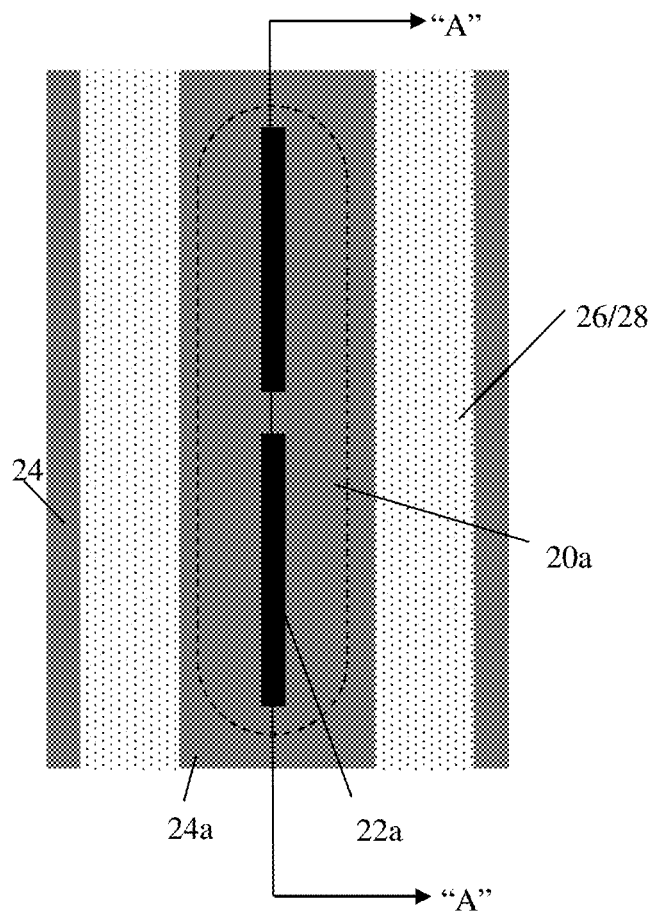
FIG. 9A shows a cross-sectional view of the waveguide structure and attenuator, amongst other features, and respective fabrication processes in accordance with aspects of the present disclosure.
Figure 9B:
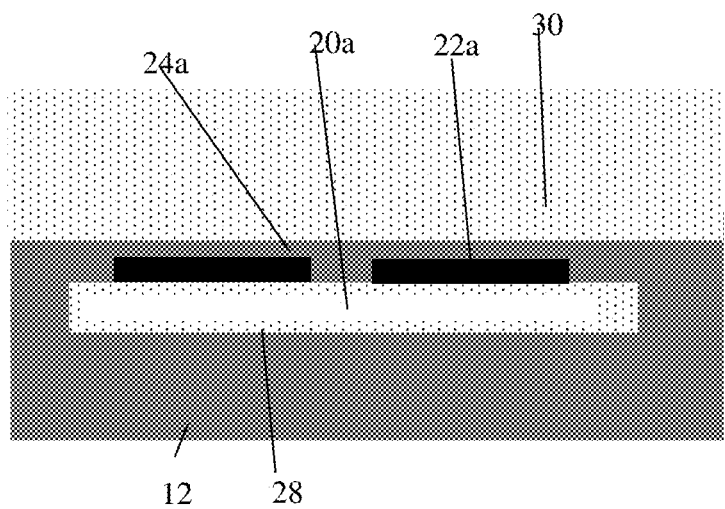
FIG. 9B shows a side view of the structure of FIG. 9A, along lines "A"-"A".

FIG. 9A shows a cross-sectional view of the waveguide structure 24a and attenuator 22a and FIG. 9B shows a side view of the structure of FIG. 9A, along lines "A"-"A". As shown in FIGS. 9A and 9B, the attenuator 22a is a bar shaped structure that includes an aspect ratio of greater than 1:1 and preferably about 10:1. In one illustrative example, the width of the attenuator 22a can be approximately 0.1 µm to 0.25 µm and the length can be about 5.0 µm; although other dimensions are contemplated herein. Moreover, the waveguide structure 24a can have a thickness of about 0.3 µm or greater, with a width defined between the shallow trench isolation structures 26 of about 0.2 µm or greater, e.g., 3 µm. In addition, the airgap structure 20a can be a single oblong structure comprising conjoined cavities, lined with the oxide material 28 of the shallow trench isolation structures 26. The attenuator 22a and the waveguide structure 24a are in parallel and aligned with the airgap structure 20a, with the attenuator 22a and the waveguide structure 24a being cladded with the oxide material 28.

Simulations show that the waveguide structures with attenuator disclosed herein provide advantages over conventional waveguide structures. For example, TCAD simulations show that >30 dB absorption, e.g., 33.5 dB, can be achieved with a single 10 µm-long Ge strip used for the attenuator 22a. Similarly, simulations show that >30 dB absorption, e.g., 33.5 dB, can be achieved with two 5 µm-long Ge strips used for the attenuator 22a. Also, a single 5 µm strip of Ge used for the attenuator 22a can achieve an absorption of greater than 15 dB.

The waveguide structure with attenuator can be utilized in system on chip (SoC) technology. It should be understood by those of skill in the art that SoC is an integrated circuit (also known as a "chip") that integrates all components of an electronic system on a single chip or substrate. As the components are integrated on a single substrate, SoCs consume much less power and take up much less area than multi-chip designs with equivalent functionality. Because of this, SoCs are becoming the dominant force in the mobile computing (such as in Smartphones) and edge computing markets. SoC is also commonly used in embedded systems and the Internet of Things.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a waveguide structure comprising semiconductor material;
   an attenuator underneath the waveguide structure;
   an airgap structure vertically aligned with and underneath the waveguide structure and the attenuator; and
   shallow trench isolation structures on sides of the waveguide structure and merging with the airgap structure, wherein the attenuator comprises Ge material, the semiconductor material comprises Si material and the Ge material seals the airgap structure.

2. The structure of claim 1, wherein the Ge material is within a trench above the airgap structure.

3. The structure of claim 1, wherein the shallow trench isolation structures comprise dielectric material which also lines the airgap structure.

4. The structure of claim 1, wherein the airgap structure comprises an aspect ratio of greater than 1:1.

5. The structure of claim 1, wherein the attenuator comprises an aspect ratio of greater than 1:1.

6. The structure of claim 1, wherein the airgap structure is sealed with Si and SiGe material.

7. The structure of claim 1, further comprising a marker layer comprising a same material as the attenuator, the marker layer being formed on bulk substrate.

8. The structure of claim 1, wherein the attenuator and the waveguide structure are on bulk substrate.

9. A structure comprising:
   a waveguide structure on bulk substrate and comprising a first semiconductor material;
   an attenuator vertically aligned with and underneath the waveguide structure, the attenuator comprising a second semiconductor material different than the first semiconductor material;
   an airgap vertically aligned with the waveguide structure and the attenuator, the airgap being sealed with the second semiconductor material and lined with dielectric material underneath the waveguide structure; and
   shallow trench isolation structures comprising dielectric material on sides of the waveguide structure.

10. The structure of claim 9, wherein the shallow trench isolation structures merge with the airgap.

11. The structure of claim 9, further comprising dielectric material on a top surface of the waveguide structure.

12. The structure of claim 9, wherein the waveguide structure is clad on all sides with dielectric material.

13. The structure of claim 9, wherein the first semiconductor material comprises Si and the second semiconductor material comprises one of Ge and SiGe.

14. The structure of claim 9, wherein the attenuator comprises an aspect ratio of greater than 1:1.

15. The structure of claim 14, wherein the attenuator is formed in a trench communicating with the airgap.

16. The structure of claim 9, wherein the attenuator plugs a trench leading to the airgap.

17. The structure of claim 9, further comprising a marker layer over the bulk substrate and of a same material as the attenuator.

18. A method comprising:
   forming a waveguide structure comprising semiconductor material;
   forming an attenuator underneath the waveguide structure;
   forming an airgap structure vertically aligned with and underneath the waveguide structure and the attenuator;
   forming shallow trench isolation structures on sides of the waveguide structure and merging with the airgap structure; and
   forming a marker layer comprising a same material as the attenuator, the marker layer being formed on bulk substrate.

* * * * *